United States Patent
Huettlinger

(12) 
(10) Patent No.: US 6,338,485 B1
(45) Date of Patent: Jan. 15, 2002

(54) STRAP DEVICE FOR USE WITH A VIDEO GAME CONTROLLER

(76) Inventor: John D. Huettlinger, 855 S. Diestel Rd., Salt Lake City, UT (US) 84105

( * ) Notice: Subject to any disclaimer, the term of this patent is extended or adjusted under 35 U.S.C. 154(b) by 0 days.

(21) Appl. No.: 09/545,903

(22) Filed: Apr. 9, 2000

(51) Int. Cl.[7] ............ A63F 13/02; A63F 11/00
(52) U.S. Cl. ................................. 273/148 B
(58) Field of Search ............... 273/148 B; 2/20, 2/21, 163, 161.1

(56) References Cited

U.S. PATENT DOCUMENTS

| | | | | |
|---|---|---|---|---|
| 2,389,237 A | * | 11/1945 | Petrullo | 2/21 X |
| 4,491,325 A | * | 1/1985 | Bersheim | 273/148 B |
| 4,494,755 A | * | 1/1985 | Caillouet, Jr. | |
| 4,518,164 A | * | 5/1985 | Hayford, Jr. | |
| 4,519,097 A | * | 5/1985 | Chappell, Jr. et al. | 2/16 |
| 4,613,139 A | * | 9/1986 | Robinson | 273/148 B |
| 4,648,603 A | * | 3/1987 | Hayford, Jr. | |
| 4,763,940 A | * | 8/1988 | Held | 2/21 X |
| 4,909,514 A | * | 3/1990 | Tano | |
| 4,944,437 A | * | 7/1990 | Calvert | 2/21 X |
| 4,955,515 A | * | 9/1990 | Brull | 2/21 X |
| 5,207,791 A | * | 5/1993 | Scherbarth | |
| 5,225,831 A | * | 7/1993 | Osborn | |
| 5,488,362 A | * | 1/1996 | Ullman et al. | 341/20 |
| 5,517,692 A | * | 5/1996 | Wunderlich-Kehm | 2/21 |
| 5,706,026 A | * | 1/1998 | Kent et al. | 345/156 |
| 5,737,505 A | * | 4/1998 | Shaw et al. | |
| 5,764,164 A | * | 6/1998 | Carabiano et al. | |
| 5,796,354 A | * | 8/1998 | Cartabiano et al. | 341/22 |
| 6,012,165 A | * | 1/2000 | Cain | 2/21 |

\* cited by examiner

Primary Examiner—Raleigh W. Chiu
(74) Attorney, Agent, or Firm—Lloyd W. Sadler

(57) ABSTRACT

A video game controller joystick strap device is provided which fits on the joystick, preferably by an expandable buttonhole. This device is provided with a fastener permitting the strap to fixed around a user's thumb or finger. Cushioning is also provided to relieve the stress on the user's thumb or finger, thereby avoiding blistering or other injury. In its preferred embodiment, the fastener is a hook and loop device and a the cushioning is provided by either a layer of neoprene rubber or one or more portions of neoprene rubber mounted to a fabric layer.

6 Claims, 3 Drawing Sheets

STRAP DEVICE FOR USE WITH A VIDEO GAME CONTROLLER

BACKGROUND OF THE INVENTION

1. Field of the Invention

This invention relates to strap devices. More specifically, this invention relates to strap devices that are adapted to facilitate the control of a joystick device as used in conjunction with a video game system.

2. Description of Related Art

A variety of devices for controlling video games have been proposed. Some of these devices are wearable to enhance the user's control of the video game. However, these previous devices are not adapted specifically to work with standard video game joysticks by providing a cushioned strap which can receive the head of the joystick and which can be fixed to a user's thumb or finger, as this is this present invention of applicant.

For general background the reader is directed to the following U.S. patent documents, each of which is incorporated by reference in its entirety for the material contained therein: U.S. Pat. Nos. 4,494,755, 4,518,164, 4,648,603, 4,909,514, 5,207,791, 5,225,831, 5,488,362, 5,706,026, 5,737,505, 5,764,164, 5,796,354.

SUMMARY OF THE INVENTION

It is desirable to provide a strap restraining device that can be attached to the joystick of a standard video game controller joystick and that, when in use, wrapped around a user's thumb or finger and fixed in place to facilitate the control of a video game joystick while avoiding injuries, such as blisters, to the user's thumb, fingers or hand.

Therefore, it is the general object of this invention to provide a strap device for use with video game joysticks to facilitate the use of the joystick.

A further object of this invention is to provide a strap device for use with video game joysticks that has a hook and loop fastener providing the means for fastening the device around a user's thumb or finger.

A still further object of this invention is to provide a strap device for use with video game joysticks that has an expandable joystick receiving opening.

Another object of this invention is to provide a strap device for use with video game joysticks that provides cushioning to reduce the risk of user injury.

It is another object of this invention to provide a strap device for use with video game joysticks that is adaptable to work with most standard video game joysticks.

Additional objects, advantages and other novel features of this invention will be set forth in part in the description that follows and in part will become apparent to those skilled in the art upon examination of the following detailed description, drawings, and claims, or may be learned with the practice of the invention. The objects and advantages of this invention may be realized and attained by means of the instrumentalities and combinations particularly pointed out in the appended claims. Still other objects of the present invention will become readily apparent to those skilled in the art from the following description wherein there is shown and described the preferred embodiment of this invention, simply by way of illustration of one of the modes best suited to carry out this invention. As it will be realized, this invention is capable of other different embodiments, and its several details, specific dimensions and materials, are capable of modification in various aspects without departing from the scope of this invention. Accordingly, the drawings and descriptions should be regarded as illustrative in nature and not as restrictive.

To achieve the foregoing and other objectives, and in accordance with the purposes of the present invention, the preferred embodiment of this invention has a fabric strap with hook and loop fasteners, having an expandable joystick receiving opening on top of which is a neoprene rubber cushion.

BRIEF DESCRIPTION OF THE INVENTION DRAWINGS

Reference will now be made in detail to the present preferred embodiment of the invention, an example of which is illustrated in the accompanying drawings.

DETAILED DESCRIPTION OF THE INVENTION

Figure 1:
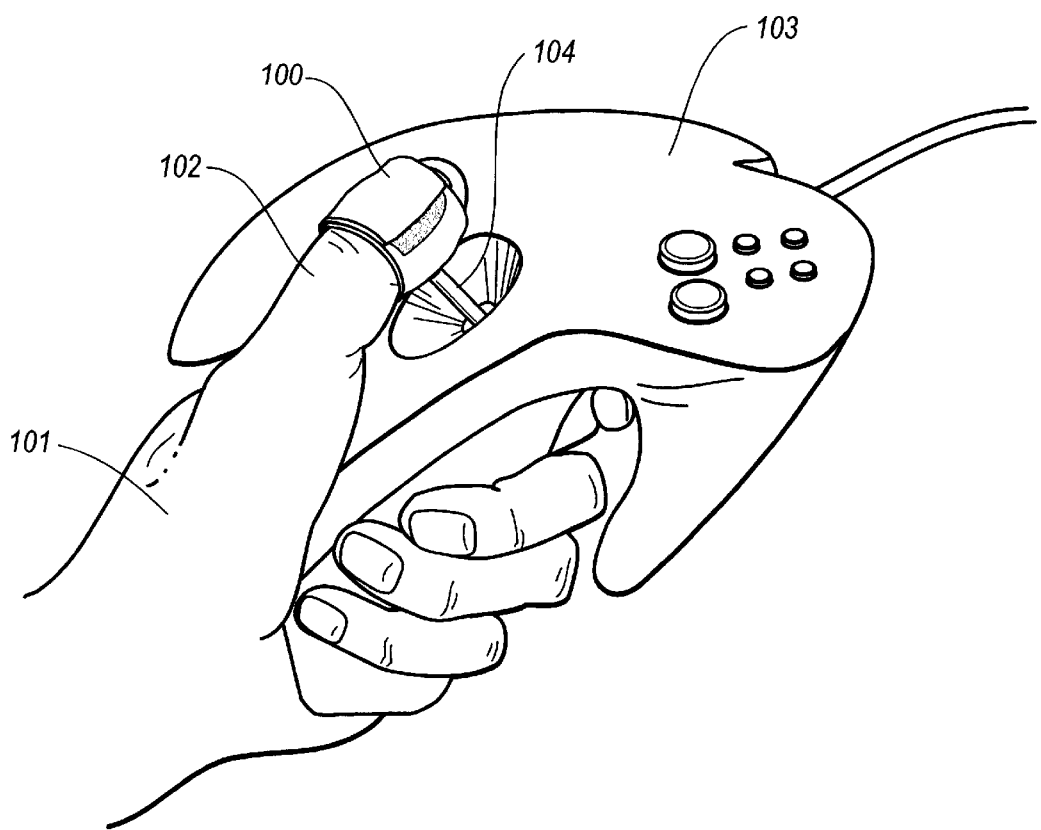
FIG. 1 is the preferred embodiment of this invention in use, being worn by a user.

FIG. 1 shows the preferred embodiment 100 of this invention being worn by a user 101 in its preferred use. This view shows the strap 100 on the left hand thumb 102, alternatively, this invention works equally well on the user's right hand. A typical video game controller 103 is shown having an integral joystick 104. The top portion of the joystick 104 is shown inserted in the strap 100, whereby the joystick 104 can be moved and controlled by the user through movement of the user's thumb 102. In its present preferred embodiment, this invention 100 is 3 ½ inches long and ¾ inch wide, although alternative dimension are envisioned as equivalents within the scope of this invention.

Figure 2:
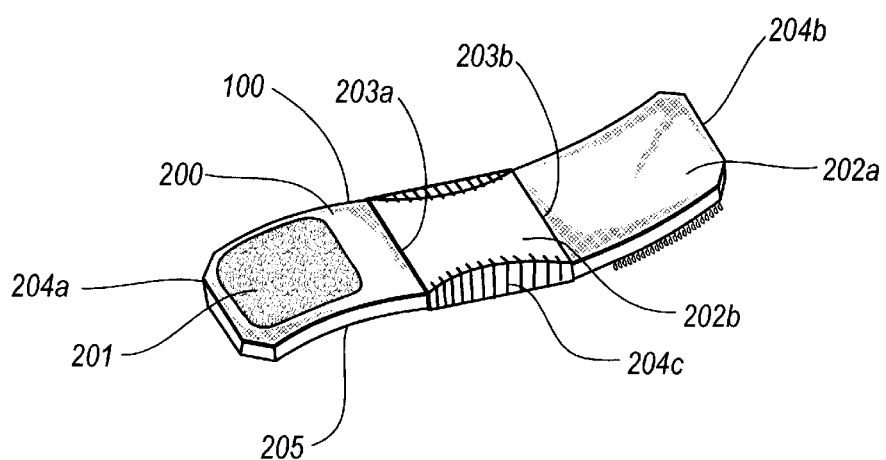
FIG. 2 is a perspective view of the top of the preferred embodiment of the invention.

FIG. 2 shows a perspective view of the top 200 of the preferred embodiment of the invention 100. A hook and loop portion 201 is provided on the first end 204a of the strap portion 205 to act as a fastening means. Other alternative fastening means, including but not limited to buttons, snaps, clips and the like, can be substituted without departing from the concept of this invention. A first cushioning region 202a is provided on the second end 204b of the strap portion 205. A second cushioning region 202b is provided generally in the center 204c. In the preferred embodiment of the invention the cushioning regions 202a, 202b is composed of exposed rubber neoprene, although alternative materials, having cushioning properties, can be substituted without departing from the concept of this invention. The second cushioning region 202b is preferably fixed by adhesive to the strap portion 205. Alternatively, the second cushioning region 202b may be fixed to the strap portion 205 by stitching, stapling or similar methods. The two cushioning regions 202a,b are provided to cushion the user's thumb 102 from mechanical pressure during use.

Figure 3:
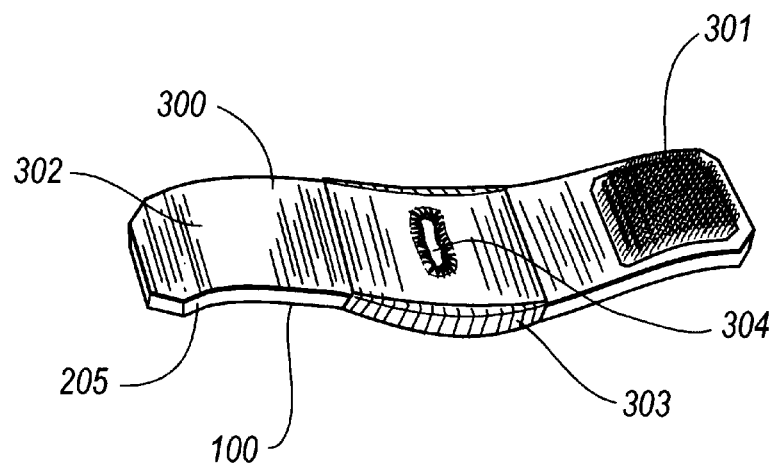
FIG. 3 is the perspective view of the bottom of the preferred embodiment of the invention.

FIG. 3 shows the perspective view of the bottom 300 of the preferred embodiment of the invention 100. This view shows the second fastening hook and loop portion 301 mounted on the strap portion 205, preferably by stitching or adhesive. A first end 302 of the bottom 300 has exposed the preferred material of the strap 205, which preferably is a fabric material. Alternative materials including synthetics, metallic links, and other flexible materials can be substituted without departing from the concept of this invention. This view also shows the flexible joystick receiving opening 304, which in this case is formed similar to a buttonhole, although alternative openings can be substituted without departing from the concept of this invention. Reinforcement stitching 303 is provided fixing the second cushioning portion 202b to the strap portion 205, thereby providing a cavity for holding the joystick 104 within the invention 100.

Figure 4:
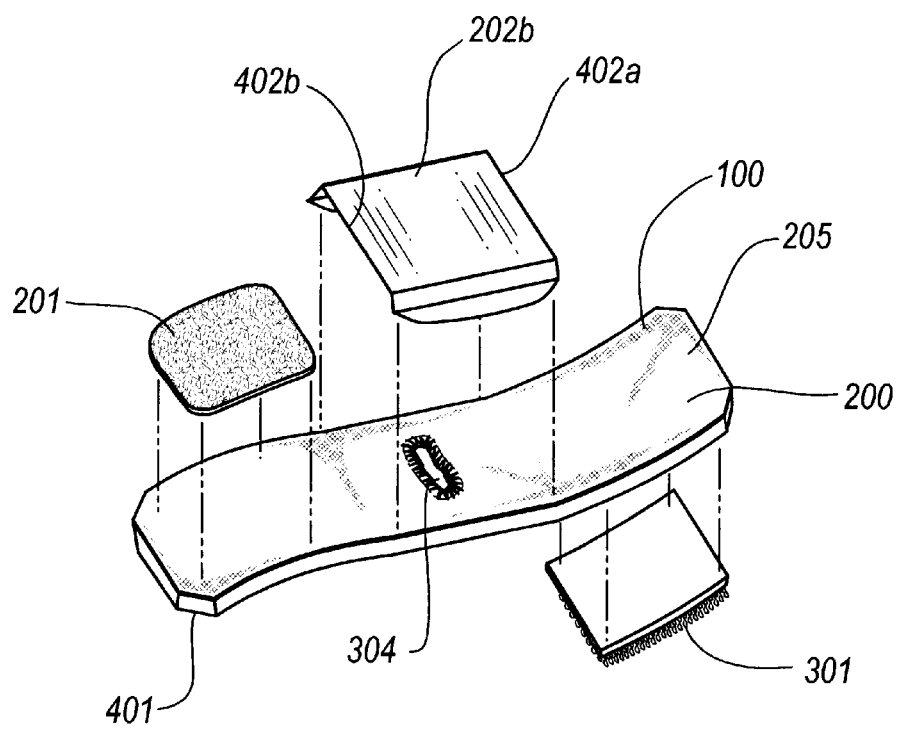
FIG. 4 is a detail perspective view of the preferred embodiment of the invention with the major components of the invention shown relative to the proximate locations for assembly.

FIG. 4 shows a detail perspective view of the top 200 of preferred embodiment of the invention 100 with the major components of the invention shown relative to the proximate locations for assembly. The strap portion 205 with the hook and loop portions 201, 301 shown proximately to the strap portion 205. The flexible joystick receiving opening 304 is shown below the center cushioning portion 202b, which is shown with tapered edges 402a,b as used in the preferred embodiment 100. The preferred material 401 of the strap portion 205 is a fully exposed neoprene rubber layer fixed, by stitching or its equivalent, to a fabric layer.

Figure 5:
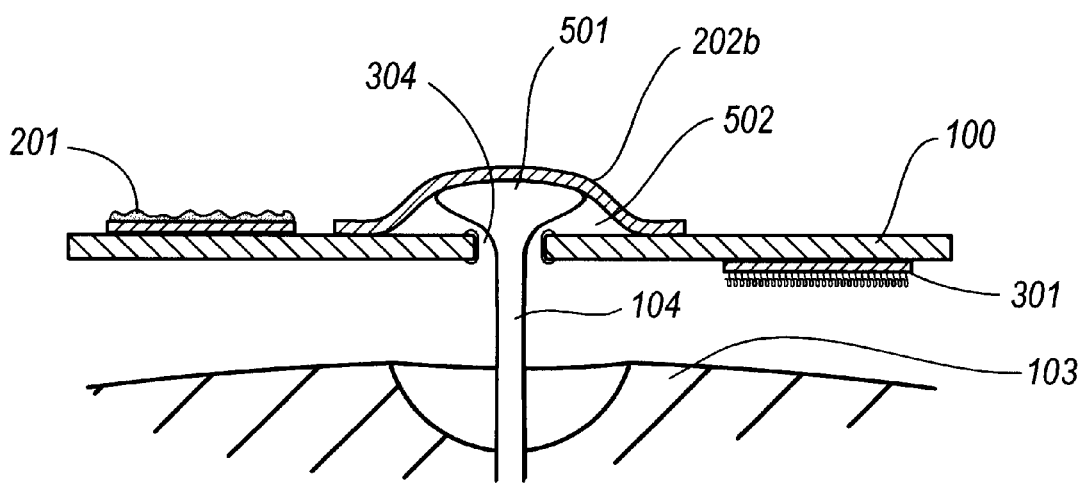
FIG. 5 is a detailed section view of the strap of this invention with the joystick inserted in the joystick cavity of the invention.

FIG. 5 shows a detailed section view of this invention 100 with the joystick 104 inserted through the flexible joystick opening 304 into the joystick cavity 502. The top 501 of the joystick 104 is shown within the cavity 502 formed by the second cushioning portion 202b and the strap portion 205 with access to the cavity 502 provided by the flexible joystick opening 304.

The foregoing description is of a preferred embodiment of the invention and has been presented for the purposes of illustration and description of the best mode of the invention currently known to the inventor. It is not intended to be exhaustive or to limit the invention to the precise form, shape, dimensions, materials disclosed. Obvious modifications or variations are possible and foreseeable in light of the above teachings. This embodiment of the invention was chosen and described to provide the best illustration of the principles of the invention and its practical application to thereby enable one of ordinary skill in the art to utilize the invention in various embodiments and with various modifications as are suited to the particular use contemplated. All such modifications and variations are intended to be within the scope of the invention as determined by the appended claims when they are interpreted in accordance with the breadth to which they are fairly, legally and equitably entitled.

I claim:

1. A video game joystick strap, comprising:

(A) a strap portion, adapted to fit about a user's thumb, having a top side, a bottom side, a first end, a second end and a middle region;

(B) a first fastener portion fixed to said first end of said top side of said strap portion;

(C) a second fastener portion fixed to said second end of said bottom side of said strap portion;

(D) a cushion portion fixed to said middle region of said strap portion; and (E) a joystick receiving opening, for engaging a joystick device, in said bottom of said strap portion.

2. A video game joystick strap, as recited in claim 1, further comprising a joystick receiving cavity defined by said cushion portion and said middle region of said strap portion.

3. A video game joystick strap, as recited in claim 1, further comprising a second cushion fixed to said second end of said top of said strap portion.

4. A video game joystick strap, as recited in claim 1, wherein said strap portion further comprises a fabric layer and a cushioning layer.

5. A video game joystick strap, as recited in claim 1, wherein said first fastener portion and said second fastener portion is a fastener selected from the group consisting of a hook and loop fastener, a snap fastener, a button fastener, and a clip fastener.

6. A video game joystick strap, as recited in claim 2, wherein said cavity is adapted to receive a standard video game controller joystick.

* * * * *